No. 613,780. Patented Nov. 8, 1898.
C. ROSENFELD.
REFUSE CART.
(Application filed Feb. 16, 1898.)
(No Model.)
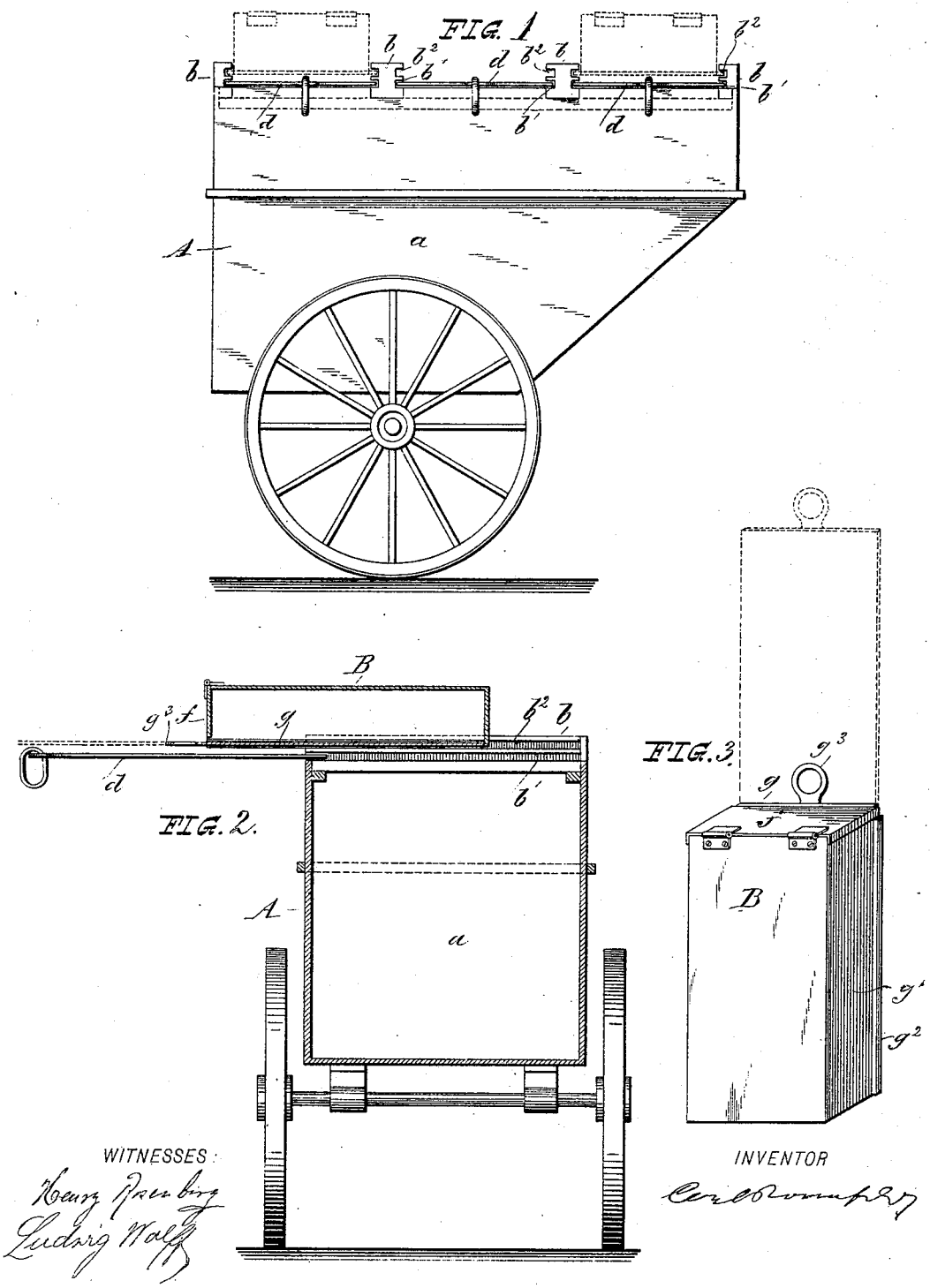
WITNESSES
INVENTOR
THE NORRIS PETERS CO., PHOTO-LITHO., WASHINGTON, D. C.

UNITED STATES PATENT OFFICE.

CARL ROSENFELD, OF NEW YORK, N. Y.

REFUSE-CART.

SPECIFICATION forming part of Letters Patent No. 613,780, dated November 8, 1898.

Application filed February 16, 1898. Serial No. 670,595. (No model.)

*To all whom it may concern:*

Be it known that I, CARL ROSENFELD, a citizen of Austria-Hungary, and a resident of New York, in the county and State of New York, have invented certain new and useful Improvements in Refuse-Carts, of which the following is a specification.

My invention has reference to improvements in refuse-carts, and has the object to provide a refuse-cart into which the ash and garbage pans or boxes can be emptied without producing dust and bad smell, which is the case with the carts of that kind at present in use. These carts have a body open at the top into which the contents of the ash and garbage pans or boxes are shed, which is not alone of great annoyance to the persons passing the streets, but also detrimental to health, as the noxious effluvia contained in the refuse are allowed to escape and infect the air.

My improved refuse-cart, which has the purpose to do away with the said disadvantages, is illustrated in the accompanying drawings, in which—

Figure 1 is a front view of the same; Fig. 2, a vertical section of Fig. 1, and Fig. 3 a detail showing the construction of the ash pan or box used with the refuse-cart.

Similar letters of reference indicate corresponding parts.

A in the drawings represents a cart, and $a$ the body of the same. The open top of the body is provided with a series of traversing bars $b$, which are attached to the upper edges of the side walls of the body. The inner bars are on each side provided with two lateral longitudinal grooves $b'$ $b^2$, one above the other, and the outer bars have two such grooves on the inner side. In the lower grooves $b'$ of the corresponding bars sliding plates $d$ are located, by which the top openings created by the said bars are closed. The upper series of grooves serve as guides for the ash pans or boxes to be placed on top of the cart-body and emptied into the same.

B shows the ash and garbage pan or box used with the described refuse-cart. This pan or box has preferably an oblong shape and is closed by a hinged covering-plate $f$. The lower wall $g$ of the same is removable and slides in guide-grooves. Each of the two fixed side walls $g'$ is near its lower edge provided with an outwardly-extending longitudinal flange or slot $g^2$, which fit into the upper guide-grooves $b^2$ of the bars $b$, as shown in Fig. 1. The removable side wall serves to remove the contents of the pan or box by drawing the side wall out and allowing the contents to drop through the opening thus produced.

The ash and garbage pans or boxes are distributed in the dwellings and filled with the household refuse, which is collected by cart-drivers or other attendants in the usual manner.

The contents of the pans or boxes are discharged as follows: The full pan or box is with its flanges $g^2$ pushed into the grooves $b^2$ of one pair of bars $b$ and placed on top of the cart-body. Then the sliding plate $d$ below the pan or box is drawn out, whereby an opening in the top of the cart-body is created, and finally the sliding wall $g$ is taken hold of by the handle $g^3$ and drawn out, so that the refuse is discharged from the pan or box into the cart-body without allowing any dust or bad smell to escape into the free air. The sliding wall $g$ and the sliding plate $d$ are then pushed back and the closed pan or box withdrawn from the closed cart-body. The contents are then not accessible without opening the top of the cart-body. The cart is emptied by removing the sliding plates $d$ and then dumping it.

Having thus described my invention, I claim as new and desire to secure by Letters Patent—

1. A refuse-cart having on top of the cart-body one or more openings closed by means of sliding plates and guide-bars attached to the body-top, in combination with pans or boxes located between the guide-bars and having each a removable side wall immediately above the corresponding sliding plate of the cart-body, substantially as set forth.

2. In a refuse-cart, the combination of a cart-body having on its top one or more openings, traversing bars provided each with two guide-grooves, one groove above the other, and attached to the top of the cart-body, with sliding plates located in the lower guide-groove and closing the said openings, and removable pans or boxes having each a sliding wall and lateral flanges, the flanges being located in the upper guide-grooves of the traversing bars and the sliding walls placed above the sliding plates of the cart-body, substantially as set forth.

CARL ROSENFELD.

Witnesses:
GEORGE A. BOWMAN,
LUDWIG WOLFF.